H. SCHNEIDER.
RAISING BEAM SCALE.
APPLICATION FILED DEC. 4, 1911.
1,029,949.
Patented June 18, 1912.
2 SHEETS—SHEET 1.
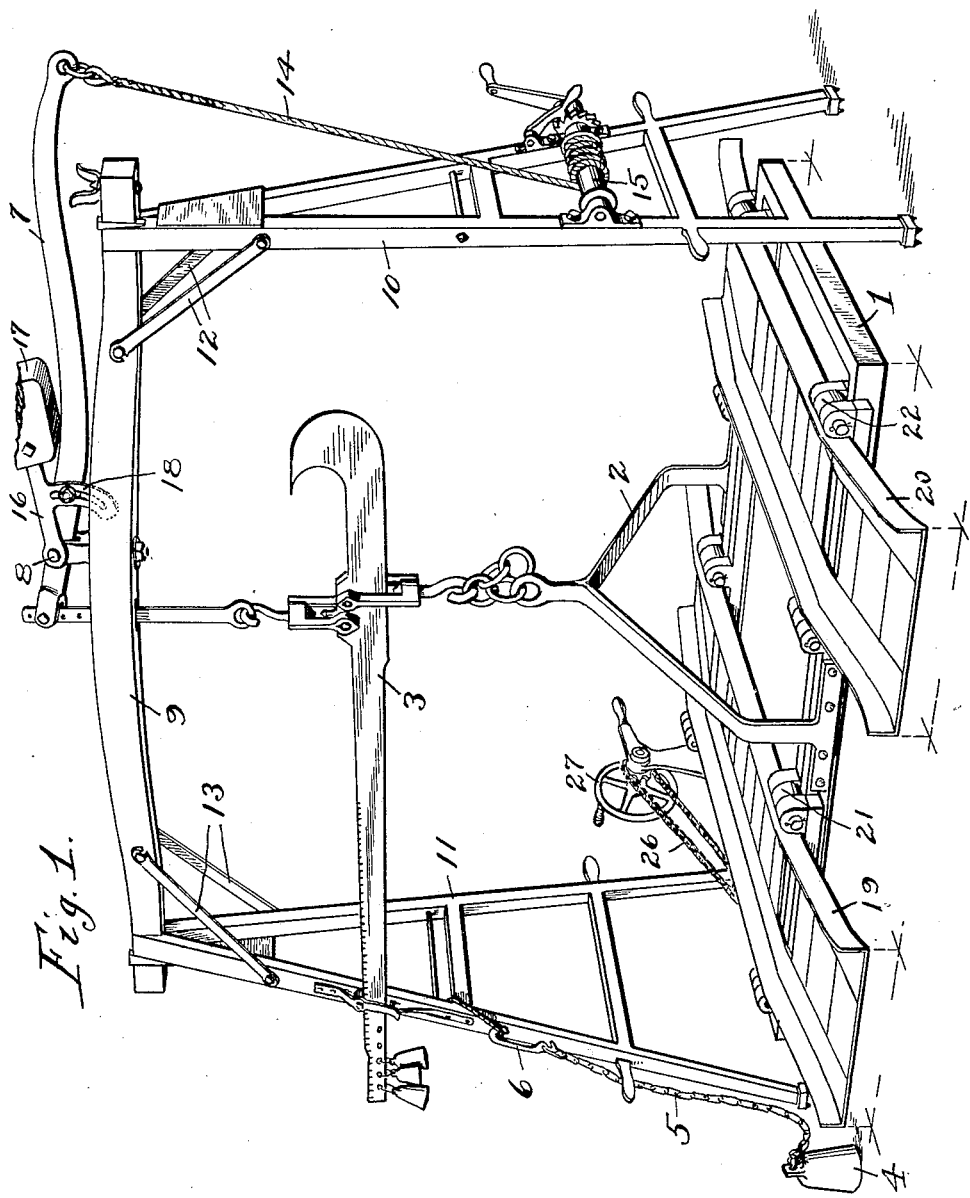
WITNESSES:
INVENTOR
Harry Schneider
BY
Lewis J. Doolittle
ATTORNEY

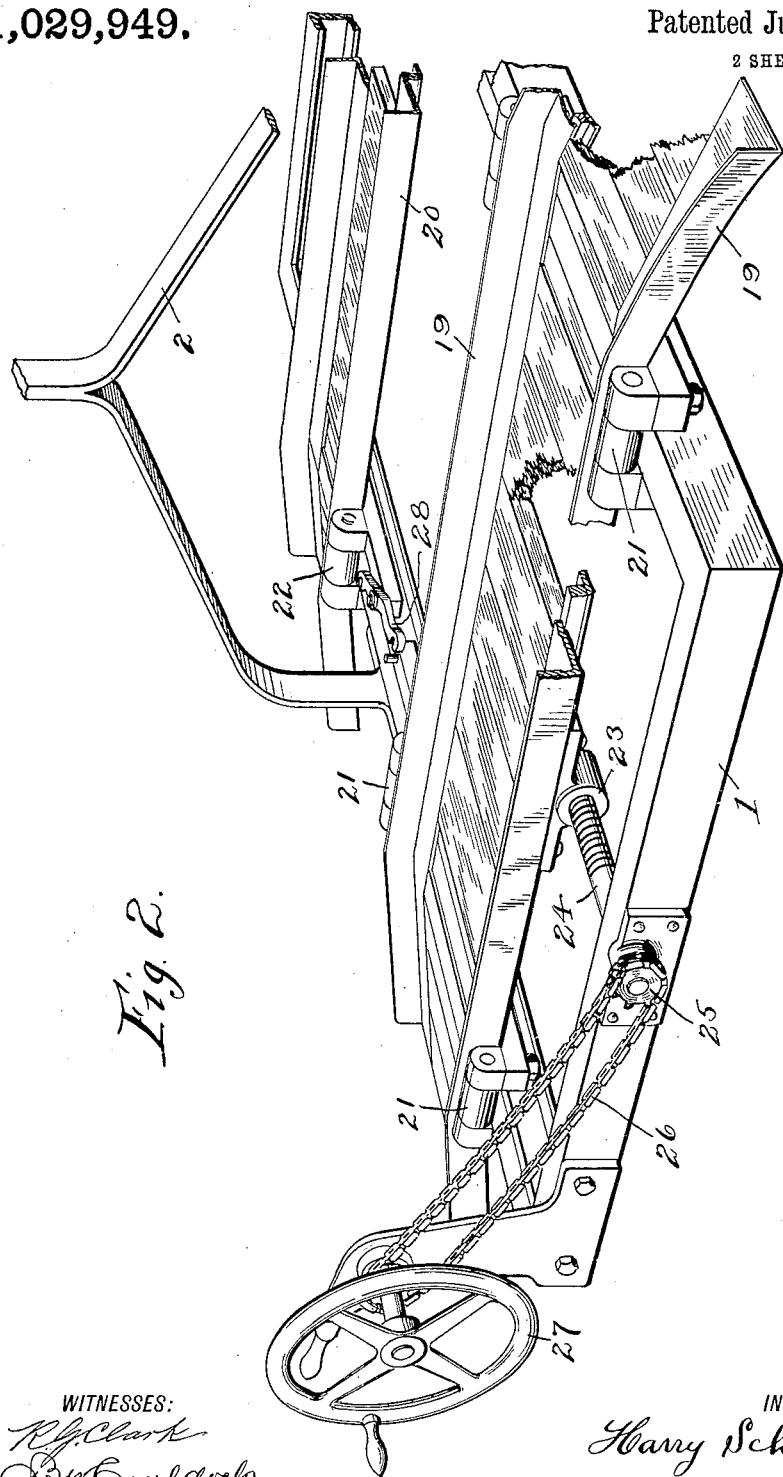

UNITED STATES PATENT OFFICE.

HARRY SCHNEIDER, OF NEW YORK, N. Y.

RAISING BEAM-SCALE.

1,029,949.  Specification of Letters Patent.  Patented June 18, 1912.

Application filed December 4, 1911. Serial No. 663,806.

*To all whom it may concern:*

Be it known that I, HARRY SCHNEIDER, a citizen of the United States, and resident of the city of New York, borough of Brooklyn, county of Kings, and State of New York, have invented certain new and useful Improvements in Raising Beam-Scales, of which the following is a specification.

This invention relates to a weighing device or scale of the raising beam type and has for its object the provision of a simple and novel construction in which the platform of the scale normally rests upon a fixed support while the article or articles to be weighed are placed in position thereon. The platform is suspended from a scale beam and means are provided for raising the scale beam and platform, together with the articles to be weighed.

One of the numerous objects of the invention is to provide a means for adjusting the position of the articles to be weighed upon the platform relative to the point of suspension thereof so that the same will be balanced and a more accurate weighing secured.

In carrying out my invention I have illustrated the same as embodied in a portable platform scale in which guides are mounted upon the platform on opposite sides of the point of suspension so as to provide for the placing of any heavy articles thereon, such as loaded trucks, etc. These guides are provided with means for adjusting the position of the same so that if the two loads are unequal in weight, the same may be adjusted after being placed upon the platform so as to balance one another when the platform is raised.

Other objects of the invention will be obvious in connection with the description of the embodiment shown in the accompanying drawings.

Figure 1 is a perspective view of a portable raising beam scale, embodying the invention. Fig. 2 is an enlarged perspective view of a portion of the platform.

The platform 1 is preferably in the form of a rectangular frame suspended at the center by means of a yoke 2, which in turn is carried by a central beam 3. The weight 4 is arranged to be suspended from the scale beam 3 by means of the chain 5 and the hook 6. The scale beam 3 and its attached parts are suspended from a lever 7 which is pivotally mounted at 8 upon an upper cross bar 9 on the supporting frame. This supporting frame is provided with detachable end members 10 and 11, which are secured thereto by the braces 12 and 13 which are arranged to hook over suitable pins on the cross-bar 9 and thus provides a knock down construction permitting the scale to be readily taken apart. At the outer end of the lever 7 a cable 14 is attached which in turn is arranged to be wound upon a suitable windlass 15 for raising the scale beam and platform, as will be readily understood by reference to Fig. 1. An auxiliary lever 16 provided with a weight 17 is pivotally mounted at 8 and provided with adjustable connections 18 with the supporting lever 7. The purpose of this auxiliary weighted lever is to counter-balance the weight of the platform so that less power is required at the windlass 15 to raise the same.

The platform 1 is provided with a pair of guides 19 and 20 which are preferably in the form of parallel angular members slidably mounted transversely upon the platform 1. As shown in the drawings these guides are provided with rollers 21 and 22, respectively, so that the same may be more readily moved. The means for moving or adjusting the position of these guides is clearly shown in Fig. 2 and comprises a threaded member 23 attached to one of the guides in connection with which a screw threaded shaft 24 is operated by means of sprocket 25 and chain 26, driven by the hand wheel 27.

A detachable connection 28 is provided between the two guides 19 and 20 so that both of the same may be moved simultaneously or one alone may be moved and it will thus be seen that when the loaded trucks or the articles to be weighed are in position on the guides 19 and 20 that the same may be adjusted in position upon the platform 1 so that if the weight of one exceeds that of the other they may be placed in such a position as to balance one another relative to the point of suspension of the platform, which condition it will be understood, is essential in order to secure an accurate record of the weight.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:

1. In a weighing device, in combination, a scale beam, a platform suspended from said scale beam, two sets of guides slidably mounted upon said platform, a separable connection between said sets of guides whereby one or both may be adjusted in position relative to the point of suspension of said platform, and means for adjusting the position of said guides.

2. In a weighing device, in combination, a scale beam, a platform suspended from said scale beam, two sets of guides mounted upon said platform each adapted to receive a load, means for sliding one of said guides toward or away from the other of said guides to compensate for the difference in weight of the respective loads.

3. In a weighing device, in combination, a scale beam, a platform suspended from said scale beam, two sets of guides mounted upon said platform each adapted to receive a load, means for simultaneously moving both of said guides on said platform to compensate for the difference in weight of the respective loads.

4. In a weighing device, in combination, a scale beam, a platform suspended from said scale beam, two sets of guides mounted upon said platform each adapted to receive a load, means for moving one or both of said guides on said platform to compensate for the difference in weight of the respective loads.

5. In a weighing device, in combination, a scale beam, a platform suspended from said scale beam, a plurality of guides on said platform, a threaded member on one of said guides, a screw threaded shaft passing through said threaded member, means for connecting said guides together, and means for rotating said threaded shaft to move said guides on said platform.

Signed at New York city in the county of New York and State of New York, this 28th day of Nov. 1911.

HARRY SCHNEIDER.

Witnesses:
R. G. CLARK,
B. W. COULDOCK.

---

Copies of this patent may be obtained for five cents each, by addressing the "Commissioner of Patents, Washington, D. C."